(12) United States Patent
Herkenhoff et al.

(10) Patent No.: US 7,679,990 B2
(45) Date of Patent: Mar. 16, 2010

(54) METHODS FOR ACQUIRING AND PROCESSING SEISMIC DATA FROM QUASI-SIMULTANEOUSLY ACTIVATED TRANSLATING ENERGY SOURCES

(75) Inventors: E. Frederic Herkenhoff, Ornida, CA (US); Joseph P. Stefani, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 462 days.

(21) Appl. No.: 10/582,682

(22) PCT Filed: Dec. 6, 2004

(86) PCT No.: PCT/US2004/040978

§ 371 (c)(1),
(2), (4) Date: Feb. 20, 2007

(87) PCT Pub. No.: WO2005/062075

PCT Pub. Date: Jul. 7, 2005

(65) Prior Publication Data

US 2007/0272473 A1   Nov. 29, 2007

(51) Int. Cl.
*G01V 1/38* (2006.01)
(52) U.S. Cl. .................... 367/23; 367/20; 367/153; 181/118; 181/120
(58) Field of Classification Search .............. 367/15, 367/20, 21, 144, 153, 154, 158, 23; 181/110, 181/111, 118, 120
See application file for complete search history.

(56) References Cited

U.S. PATENT DOCUMENTS 3,285,363 A * 11/1966 Krey ..................... 367/49
3,491,848 A * 1/1970 Giles .................... 367/17
3,569,922 A * 3/1971 Parr ..................... 367/54
3,687,218 A * 8/1972 Ritter ................... 367/23
3,893,539 A * 7/1975 Mott-Smith ............. 181/115
3,956,730 A * 5/1976 Barbier .................. 367/37
3,984,805 A * 10/1976 Silverman ............... 367/190
4,106,585 A * 8/1978 Huizer .................. 181/107
4,148,870 A * 4/1979 Hydes et al. ............ 435/40.52

(Continued)

FOREIGN PATENT DOCUMENTS

WO    WO0210798    * 2/2002

*Primary Examiner*—Jack W. Keith
*Assistant Examiner*—Scott A Hughes
(74) *Attorney, Agent, or Firm*—Richard Schulte; Maurice Teixeira

(57) ABSTRACT

A method for obtaining seismic data is disclosed. A constellation of seismic energy sources is translated along a survey path. The seismic energy sources include a reference energy source and a satellite energy source. The reference energy source is activated and the satellite energy source is activated at a time delay relative to the activation of the reference energy source. This is repeated at each of the spaced apart activation locations along the survey path to generate a series of superposed wavefields. The time delay is varied between each of the spaced apart activation locations. Seismic data processing comprises sorting the traces into a common geometry domain and replicating the traces into multiple datasets associated with each particular energy source. Each trace is time adjusted in each replicated dataset in the common-geometry domain using the time delays associated with each particular source. This result in signals generated from that particular energy source being generally coherent while rendering signals from the other energy source is generally incoherent. The coherent and incoherent signals are then filtered to attenuate incoherent signals.

7 Claims, 7 Drawing Sheets

U.S. PATENT DOCUMENTS

| | | | | |
|---|---|---|---|---|
| 4,159,463 A * | 6/1979 | Silverman | | 367/59 |
| 4,170,002 A * | 10/1979 | Strange | | 367/23 |
| 4,242,740 A * | 12/1980 | Ruehle | | 367/15 |
| 4,254,480 A * | 3/1981 | French | | 367/58 |
| 4,357,689 A * | 11/1982 | Ruehle | | 367/23 |
| 4,441,174 A * | 4/1984 | Ray et al. | | 367/23 |
| 4,467,459 A * | 8/1984 | Currie | | 367/21 |
| 4,488,864 A * | 12/1984 | Borrelli et al. | | 430/13 |
| 4,564,927 A * | 1/1986 | Kolb | | 367/42 |
| 4,693,336 A * | 9/1987 | Newman | | 181/111 |
| 4,715,020 A * | 12/1987 | Landrum, Jr. | | 367/38 |
| 4,797,861 A * | 1/1989 | Beasley | | 367/50 |
| 4,823,326 A * | 4/1989 | Ward | | 367/41 |
| 4,953,657 A * | 9/1990 | Edington | | 181/111 |
| 4,970,696 A * | 11/1990 | Crews et al. | | 367/15 |
| 4,982,374 A * | 1/1991 | Edington et al. | | 367/48 |
| 5,247,486 A * | 9/1993 | Regnault | | 367/23 |
| 5,327,399 A * | 7/1994 | Asada et al. | | 367/190 |
| 5,408,441 A * | 4/1995 | Barr et al. | | 367/15 |
| 5,412,623 A * | 5/1995 | Asada et al. | | 367/190 |
| 5,463,594 A * | 10/1995 | Lindsey et al. | | 367/38 |
| 5,719,821 A * | 2/1998 | Sallas et al. | | 367/41 |
| 5,721,710 A * | 2/1998 | Sallas et al. | | 367/41 |
| 5,761,152 A * | 6/1998 | Jacobsen et al. | | 367/15 |
| 6,002,642 A * | 12/1999 | Krebs | | 367/73 |
| 6,483,774 B2 * | 11/2002 | Douma | | 367/16 |
| 6,882,938 B2 * | 4/2005 | Vaage et al. | | 702/17 |
| 2002/0181328 A1 * | 12/2002 | de Kok | | 367/73 |
| 2004/0136266 A1 * | 7/2004 | Howlid et al. | | 367/21 |

* cited by examiner

Common Shot Gather

Common Midpoint Gather

METHODS FOR ACQUIRING AND PROCESSING SEISMIC DATA FROM QUASI-SIMULTANEOUSLY ACTIVATED TRANSLATING ENERGY SOURCES

CROSS-REFERENCES TO RELATED APPLICATIONS

The present invention claims priority to International Application No. PCT/US2004/40978, that application claims priority to U.S. patent application Ser. No. 10/736,951. Both applications are entitled "Methods For Acquiring And Processing Seismic Data From Quasi-Simultaneously Activated Translating Energy Sources". The entirety of the aforementioned patent applications are incorporated herein by reference for all purposes.

TECHNICAL FIELD

The present invention relates generally to seismic exploration, and more particularly, to acquiring and processing seismic data generated from generally simultaneously activated seismic energy sources.

BACKGROUND OF THE INVENTION

In the hydrocarbon exploration industry, remote sensing of underground geological formations using seismic waves provides information on the location, shape, and rock and fluid properties of potential hydrocarbon reservoirs. The standard technique comprises the activation of a source of acoustic energy which radiates seismic waves into the earth. These seismic waves reflect from and refract through subsurface geologic layers (acoustic illumination or insonification). The recording of these seismic waves by many different receivers (pressure or motion sensors) are ideally situated so as to optimize the ratio of information obtained to cost. This basic sourcing/insonification/recording procedure is repeated many times at slightly different locations over a subsurface region of interest.

However, the resolution required of the seismic data for a detailed interpretation and adequate risk reduction can be suboptimal given the cost constraints inherent in seismic acquisition. Methods have been taught using generally simultaneously fired energy sources in an effort to obtain more information for a given cost.

Edington, U.S. Pat. No. 4,953,657 teaches a method of time delay source coding. In this method "a series of shots is made at each shotpoint with a determinable time delay between the activation of each source for each shot".

The "series of shots" refers to occupying each shotpoint location for several consecutive shots. This methodology may be acceptable for seismic acquisition on land where seismic sources can easily remain fixed at one shot location for an indefinite time. However, the method is not well suited for marine recording in which a seismic receiver cable is being towed behind a boat. A certain minimum velocity is necessary to preserve the approximately linear trajectory of the cable.

De Kok et. al, U.S. Pat. No. 6,545,944, teaches a method for acquiring and processing seismic data from several simultaneously activated sources. In particular, the method requires that several independently controllable "source elements" be activated in a fixed sequence, at successive neighboring locations. This activation sequence unavoidably smears the energy from a single effective source across several neighboring shot locations, necessitating an interpolation step and the introduction of unwanted interpolation noise.

Further, the success of building an effective source by spatial sequencing of source sub-elements appears to depend sensitively on source timing precision and sea-state.

Beasley et al., U.S. Pat. No. 5,924,049 also teaches a method of acquiring and processing seismic data using several separate sources. In the preferred embodiment, it teaches that the sources can be activated sequentially with a constant inter-source time delay (up to 15 and 20 seconds). During the processing stage, the method requires anywhere from 2% to 33% of data overlap between panels of data from different sources. Further, it relies on conflicting dips to discriminate energy coming from different source directions, which requires a specific spatial relationship among the sources and the recording cable, and thus is not well suited to simultaneous signals arriving from approximately the same quadrant. In a subsidiary embodiment, the several sources can be activated exactly concurrently, in which case the sources are then arranged to emit signature-encoded wavefields. The decoding and signal separation associated with this type of concurrent signature encoding is usually unsatisfactory. Furthermore, the sources need to be activated at both the leading and trailing ends of the spaced-apart receivers, which is inflexible.

The present invention contrasts with the aforementioned inventions and addresses their shortcomings by teaching a novel way of acquiring and processing seismic data obtained from two or more quasi-simultaneously activated sources.

SUMMARY OF THE INVENTION

This invention teaches a method for the acquisition of marine or land seismic data using quasi-simultaneously activated translating seismic sources whose radiated seismic energy is superposed and recorded into a common set of receivers. Also taught is the subsequent data processing required to separate these data into several independent records associated with each individual source. Quasi-simultaneous acquisition and its associated processing as described herein enable high quality seismic data to be acquired for greater operational efficiency, as compared to a conventional seismic survey.

A method for obtaining seismic data is taught. A constellation of seismic energy sources is translated along a survey path. The seismic energy sources include a reference energy source and at least one satellite energy source. A number of configurations for the arrangement of the seismic sources and the locations of seismic receivers are disclosed. The reference energy source is activated and the at least one satellite energy source is activated at a time delay relative to the activation of the reference energy source. This activation of sources occurs once each at spaced apart activation locations along the survey path to generate a series of superposed wavefields which propagate through a subsurface and are reflected from and refracted through material heterogeneities in the subsurface. The time delay is varied between the spaced apart activation locations. Seismic data is recorded including seismic traces generated by the series of superposed wavefields utilizing spaced apart receivers.

The seismic data is then processed using the time delays to separate signals generated from the respective energy sources. More specifically, the processing of the seismic data further includes sorting into a common-geometry domain and replicating the seismic traces of data into multiple datasets associated with each particular energy source. Each trace is time adjusted in each replicated dataset in the common-geometry domain using the time delays associated with each particular source. This results in signals generated from that particular energy source being generally coherent while rendering signals from the other energy sources generally incoherent. The coherent and incoherent signals are then filtered to attenuate incoherent signals using a variety of filtering techniques.

It is an object of the present invention to provide a method for acquisition of seismic signals generated "quasi-simultaneously" from several moving separated sources activated with a small time delay, and their subsequent accurate separation during data processing into independent data sets exclusively associated with each individual source. This can greatly improve operational efficiency without compromising data resolution.

BRIEF DESCRIPTION OF THE DRAWINGS

The following drawings illustrate the characteristic acquisition and processing features of the invention, and are not intended as limitations of these methods.

DETAILED DESCRIPTION OF THE PREFERRED EMBODIMENTS FOR THE INVENTION

This invention teaches a method for the acquisition of seismic data using quasi-simultaneous sources, as well as the processing of the superposed signals in order to separate the energy due to each source from the energy due to every other source in the constellation. For the purposes of this invention, the term "constellation" shall mean the set of spaced apart seismic sources bearing any relative spatial relationship among themselves, and able to move as a whole from one location to another as part of a seismic survey.

Quasi-simultaneous acquisition and its associated processing as described herein enable high quality seismic data to be acquired at a much greater operational efficiency as compared to a conventional seismic survey. The term "quasi-simultaneous" shall mean that the activation-time differences among the several sources in a constellation are not zero (thus the prefix "quasi"), but yet small enough (typically less than several seconds) so as not to interfere with the previous or succeeding shots of the seismic survey, viz., less than the recording (or "listening") time of a shot record (thus the term "simultaneous": operationally simultaneous). Acquisition, trace sorting and time correction, and noise attenuation filtering are described in turn.

Acquisition

Figure 1:
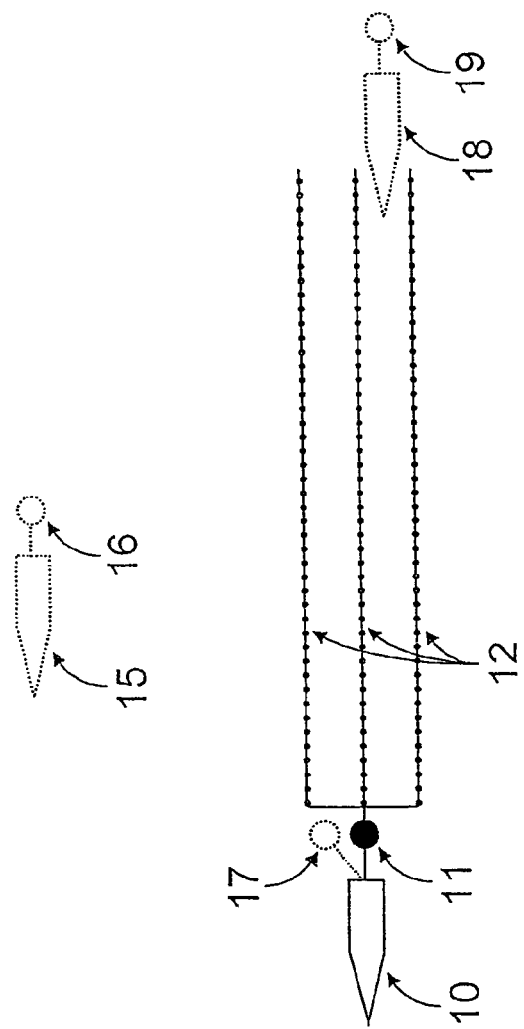
FIG. 1 is a plan view of the acquisition of seismic data using the invention with two quasi-simultaneous sources.

The first step is to acquire seismic data generated by quasi-simultaneous sources. Referring to FIG. 1, in the most preferred embodiment, the acquisition involves three-dimensional marine seismic surveying employing a seismic vessel 10 towing a reference source 11 and several trailing streamers 12 which contain seismic receivers, along with at least one other spaced apart satellite source 14, which is itself towed by a spaced apart vessel 13. The term "reference source" shall mean the source which is fired at seismic recording time zero. It can be the source nearest the recording cable (if source and cable are being towed by the same vessel in marine recording), or for example it can be the source in the constellation which is activated first. In all cases, the satellite source time delays are with respect to the reference source. For identification purposes, the constellation's location can be identified with that of the reference source. The term "satellite source" shall refer to any one of the energy sources other than the reference source. The term "time delay", abbreviated "$T_d$" shall mean a positive or negative time interval with respect to the reference source and recording time 0, and which is the sum of a positive or negative constant part (here abbreviated by "$T_c$") and a positive or negative variable part (here abbreviated by "$T_v$").

Thus $T_d = T_c + T_v$. For the reference source, $T_d = 0$.

Alternatively, vessel 13 and source 14 could be located (not shown) collinearly with and downstream from the streamer. These configurations in which the reference and satellite sources are collinear with the set of receivers provide extra offsets as compared to a conventional single-source operation. Preferably, the separation distance between the leading edge of the streamers 12 and the upstream source 14 may be about the length of the streamers 12. Likewise the separation distance between the trailing edge of the streamers 12 and the downstream source 14 (not shown) may be about the length of the streamers 12.

Those skilled in the art will appreciate that the acquisition may also be accomplished, by way of example and not limitation, with a source 19 towed by a vessel 18 near the tail end of the receiver cable and between two of the several streamers 12, or with a source 16 towed by a vessel 15 perpendicularly displaced from the direction of the receiver cable, with a source towed by a boat trailing the tail end of the receiver cable by a fixed amount, or even with a second independent source 17 towed behind vessel 10. The configuration in which the satellite source is perpendicularly displaced from the streamer of receivers provides extra azimuths as compared to a single-source operation. Further, those skilled in the art will appreciate that cables of receivers can be towed behind more than one vessel, or that the seismic receivers need not be towed behind a marine vessel but can be fixed to the earth as in land recording, ocean-bottom recording, and marine vertical-cable recording, among others.

Figure 2:
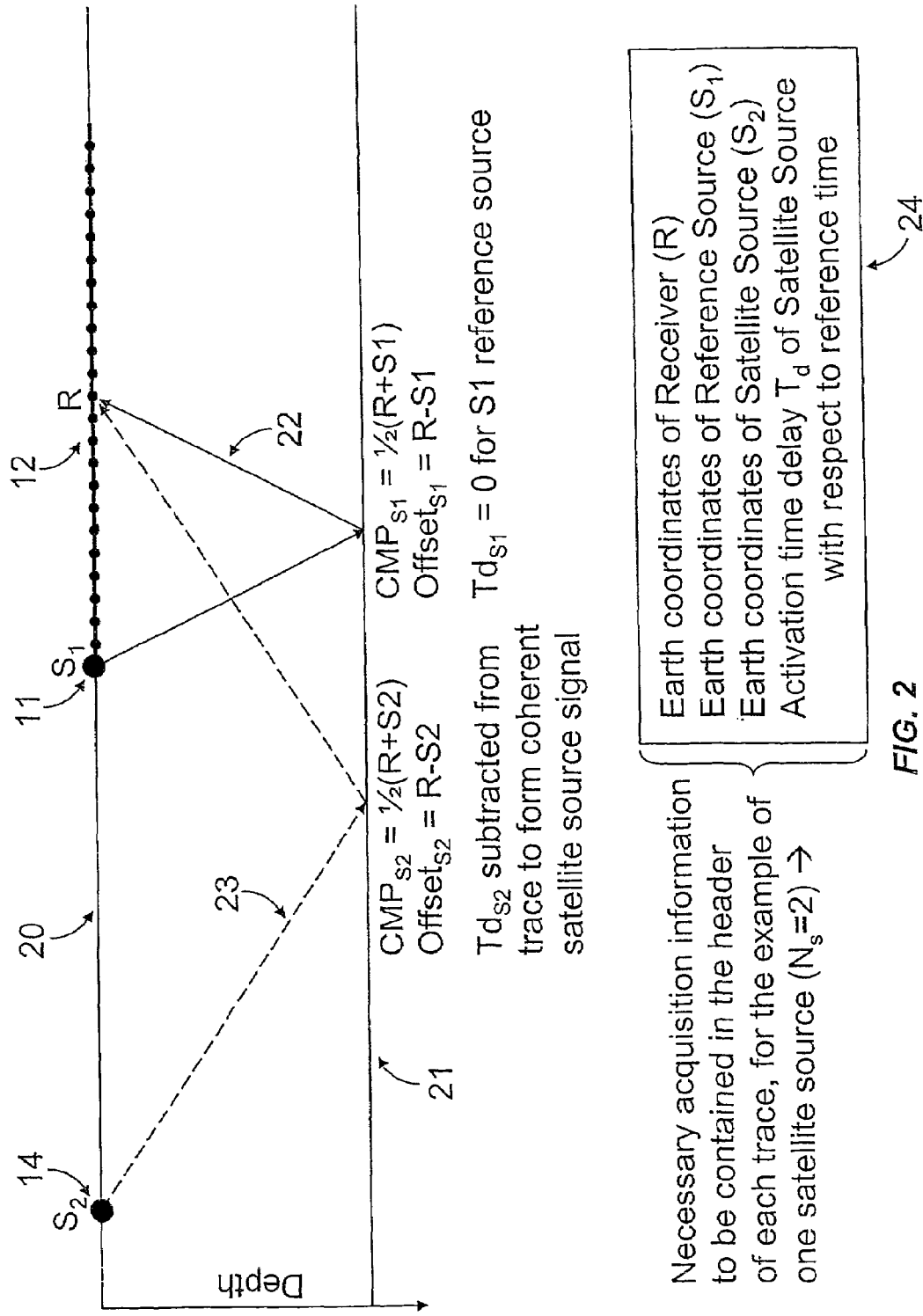
FIG. 2 is a profile view of the acquisition of seismic data corresponding to FIG. 1.

FIG. 2 is a profile view of the collinear acquisition geometry of FIG. 1. The reference source 11 (with indicated earth coordinates $S_1$) is situated on the recording surface 20 (generally the surface of the Earth) and generates seismic energy 22 which travels down to a geologic reflector 21 and is reflected back toward the receiver cable 12 (one of whose receivers has the indicated earth coordinates R). Meanwhile, the satellite source 14 (with indicated earth coordinates $S_2$) is activated quasi-simultaneously and it also generates seismic energy 23 which reflects back into the receiver cable, where it superposes with the signal from the reference source 11 and where both are recorded.

Figure 4:
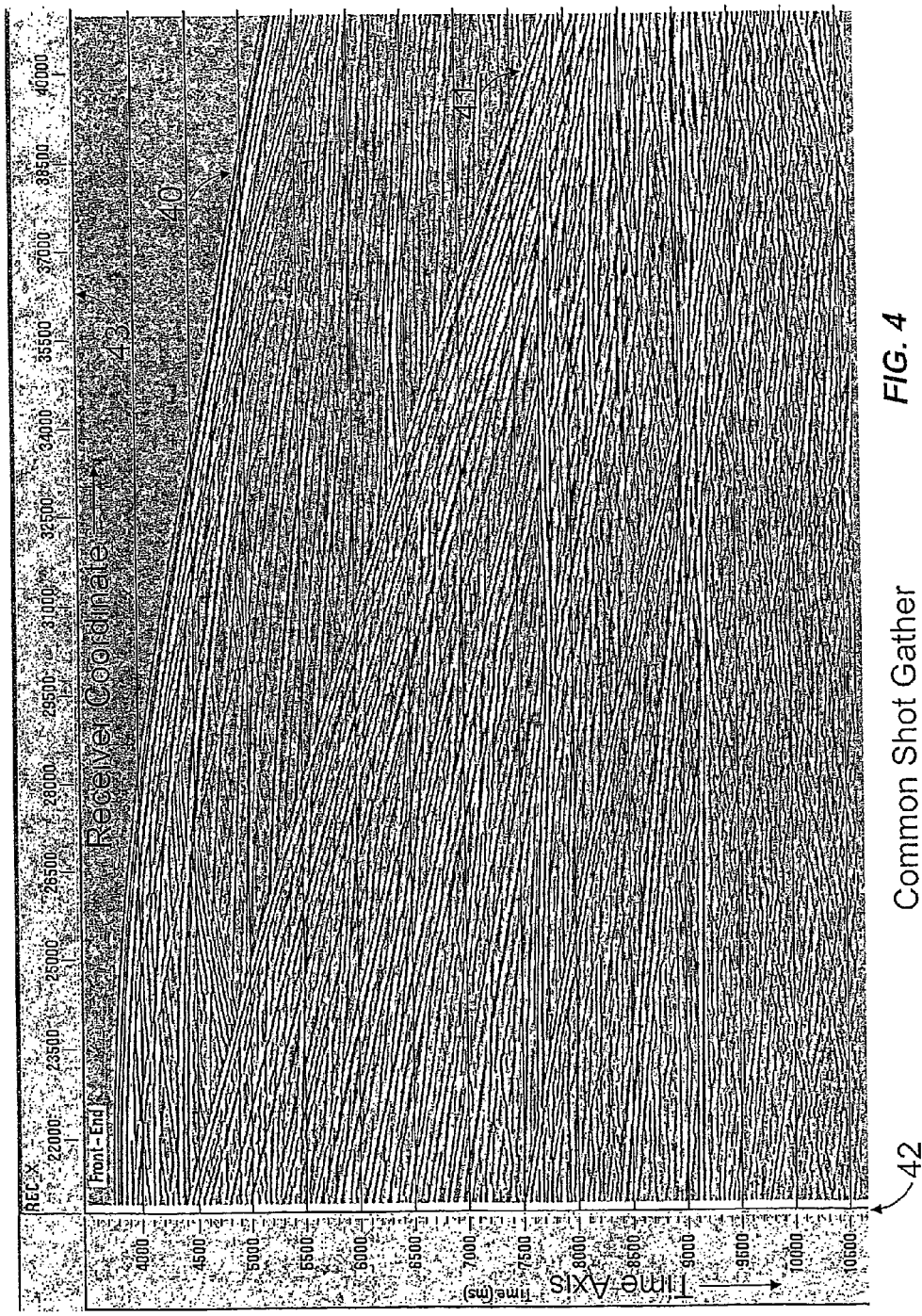
FIG. 4 is a common-shot gather showing the coherent superposed signals from the reference and satellite sources.

FIG. 4 shows a common-shot gather illustrating the superposition of energy from two quasi-simultaneous sources. A receiver cable 43 records seismic energy along a recording time axis 42. The reference source energy 40 and satellite source energy 41 are interfering and superposed on each trace of the common-shot gather.

Figure 3:
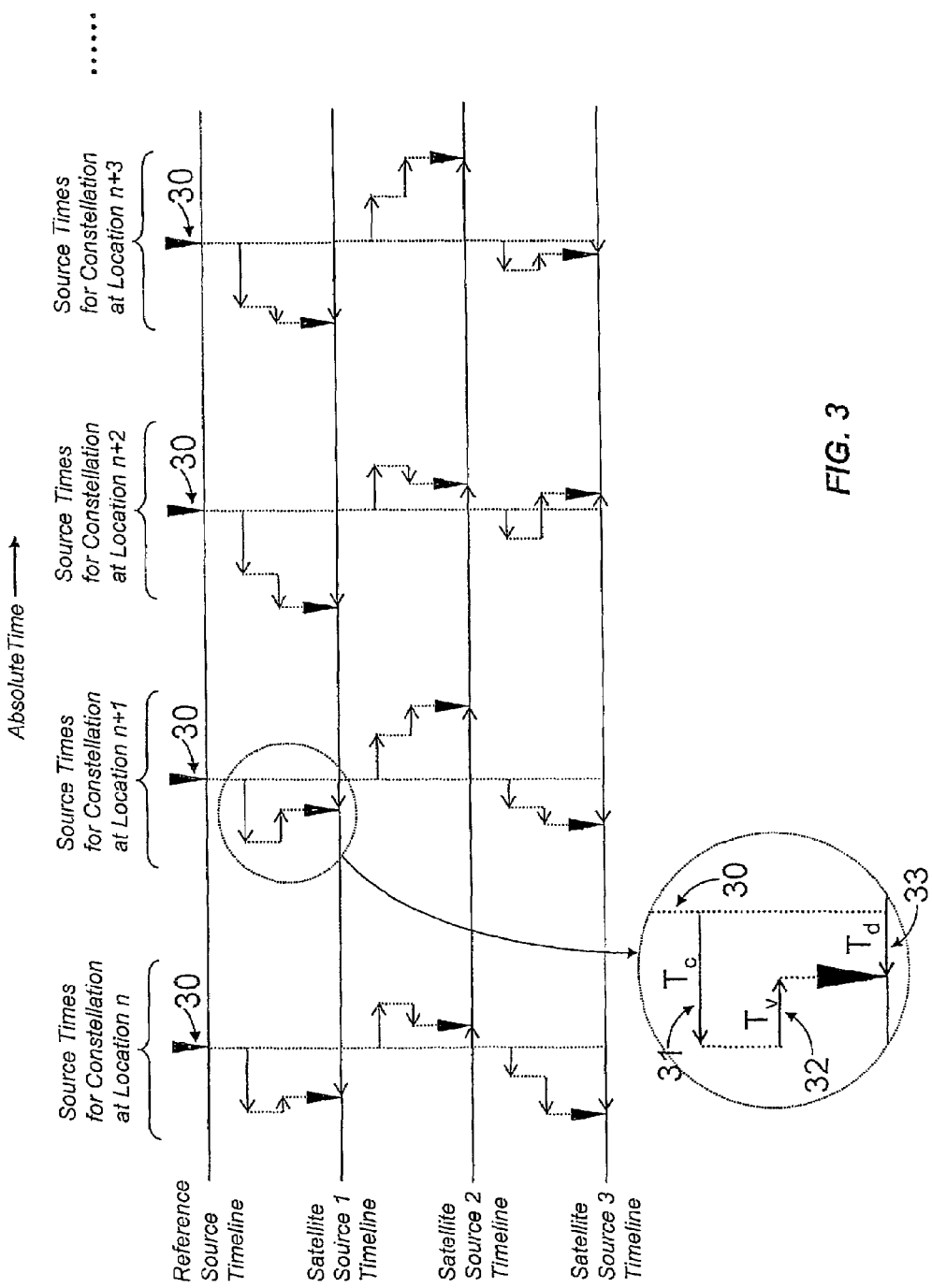
FIG. 3 illustrates the activation time delays being composed of a constant part and a variable part.

Given a current location of the constellation within the seismic survey, its Ns sources are activated quasi-simultaneously. The term "Ns" shall refer to the number of spaced apart sources populating the constellation. FIG. 3 illustrates the quasi-simultaneous timing scheme for the case of Ns=4. The constellation of sources is quasi-simultaneously activated at times 30 determined by the interval of time required for the constellation to translate between successive shot locations, which is generally the translation distance divided by the constellation velocity. Most preferably, a Global Positioning System is used to activate the reference activation source at predetermined intervals, for example 25 meters. The quasi-simultaneous source activation-time delay $T_d$ 33 (with respect to the reference source) is different for each source within the constellation, and is a sum of two parts. The first component is a predetermined positive or negative constant $T_c$ 31 for a given source in the constellation but can be different for different sources. Its optimum value is dictated by the operational need to capture all of the desired signal from that source into the seismic receivers during the current recording time window, and so depends on the specific acquisition geometry. It can be different for each source in the constellation, but is constant over the course (duration) of the survey (as long as the constellation geometry does not change). In the case of a satellite source collinear with the seismic streamer as in FIG. 1, this time might be, for example, several seconds in advance of (negative number) the near-streamer reference source activation time.

The second component is a predetermined variable time delay $T_v$ 32 which is different for each source in the constellation, and also changes with each succeeding location of the constellation within the seismic survey. In the preferred embodiment this variable component is a predetermined positive or negative random value whose value ranges from plus to minus ten times the source waveform's dominant period, although greater times are also possible. This random time dithering introduces a source-specific time-delay encoding (not signature encoding) among the several sources within the constellation, whose resultant wavefields are all superposed in the recording cable. Although not necessary, it may be beneficial to prevent successive random values of Td to be too close to one another. This can be avoided by requiring that successive values of Td be differentiated by a predetermined minimum positive or negative value. This can be accomplished simply by generating a replacement random value that is satisfactory. This overcomes the potential problem of "runs" of the same value in a random sequence, which when applied to the source time delays might create short patches of coherence where none is desired.

Although $T_c$ and $T_v$ are both predetermined, it is only their sum $T_d$ that is required in processing, and due to possible slight variation in actual source activation times, $T_d$ must be accurately measured and recorded during acquisition.

The entire seismic survey then consists of quasi-simultaneously activating the entire constellation once at each geographic location in the survey (at resultant times 30), and then moving the constellation a predetermined amount to a new location, and repeating the quasi-simultaneous source activation procedure.

Common-Geometry Trace Sorting and Trace Time-Correction

Trace sorting will now be described. After acquisition, each trace contains superposed seismic signals (reflections, refractions, etc.) from each of the Ns sources. The first stage in separating the signals from the constellation's several sources is to spatially reorganize the seismic traces from the common shot gathers into a suitable domain in which the signal from each successive source in the constellation can be selectively made coherent and all others made incoherent. As illustrated in FIG. 2, each trace includes a trace header 24 which contains, among other information, earth coordinates of the receiver and the Ns sources, as well as the time delays $T_d$ for each of the Ns−1 satellite sources. The common-shot gathers are resorted Ns times, once for each source in the constellation. Each resorting follows the conventional procedure in which each given trace is placed into a particular common-geometry gather of traces, depending on the source and receiver coordinates and the type of common-geometry desired. For example, common midpoint sorting dictates that the algebraic average of the source and receiver coordinates be a constant. Constant offset sorting dictates that the distance from source to receiver be a constant. Because the trace header contains the coordinates from Ns sources (two in the case of FIG. 2), the current trace is replicated and associated with Ns different midpoints or Ns different offsets, etc., one associated with each of the Ns sources.

For each of the Ns sources with which the trace is in turn identified, the time delay associated with that trace and source (and which is recorded in header 24) is applied in reverse to the trace timing. Thus, subtracting the time delay Td from the trace time allows the signals in the seismic trace from that source to align with similar signals on other traces within the particular constant-geometry gather, and coherent signals from that source are formed.

Figure 5:
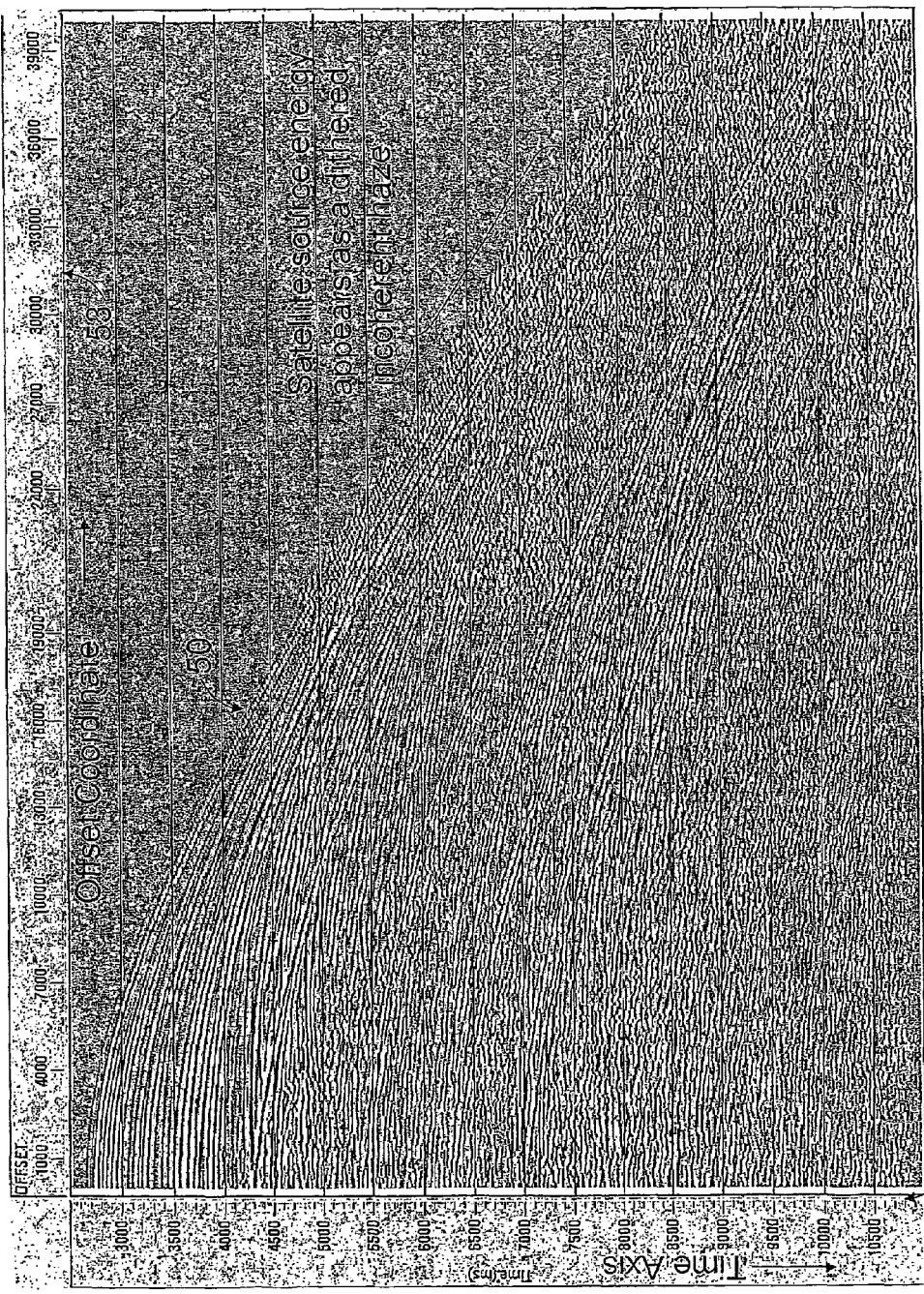
FIG. 5 is a common-midpoint gather showing the coherent signals from the reference source and the incoherent noise from the satellite source.

In the preferred embodiment the traces are resorted into Ns common-midpoint domains, each common-midpoint domain associated with a particular source of the constellation. As a visual aid, FIG. 5 shows a common-midpoint gather from the same dataset as FIG. 4, and contains data ordered along an offset axis 53 and a time axis 52.

Those skilled in the art will appreciate that other resorting may also be realized, by way of example and not limitation, by resorting the traces into common-offset domains (useful for some kinds of prestack depth migration), common-receiver domains (useful for recording and migration involving acquisition via vertical marine cable, vertical seismic profile in a well, or ocean-bottom cable), common-azimuth domains (useful for illumination within subsurface shadow zones), or indeed any other common-geometry domain in which subsequent data processing will occur. In each case, resorting the traces independently associates each common-geometry domain with a particular one of the Ns sources in the constellation.

In this resorted and time-corrected domain, each source's signal in turn becomes coherent and the signal from all other Ns−1 sources is made incoherent and appears as random noise. In this way the signal from each one of the Ns sources is made to "crystallize" into coherence at the expense of the other Ns−1 sources, producing Ns different datasets, one for each source of the constellation. This is illustrated in FIG. 5, in which the seismic signal 50 from the reference source has been made coherent, while the seismic signal from the satellite source has been turned into incoherent random noise which is scattered throughout the common-midpoint gather.

Noise-Attenuation Filtering

The next step is filtering out the unwanted noise from each of the resorted datasets. There are several approaches, depending on the particular common-geometry domain and whether the data are migrated or not. In the preferred embodiment, random noise suppression is applied to common-midpoint gathers in which coherent signal events tend to assume a hyperbolic trajectory while random noise does not follow any particular trajectory. The coherent signal events are localized in Radon space whereas the random noise is not localized in Radon space. Muting out unwanted noise events in Radon space followed by an inverse mapping to conventional time-offset space attenuates the random noise. The remaining signal can be used directly, but also can itself be time shifted back into decoherence, at which point it can be subtracted from the complementary gathers associated with the other sources prior to their Radon filtering.

Those skilled in the art will appreciate that random noise attenuation may also be accomplished, by way of example and not limitation, by other techniques such as stacking, F-X filtering, and also by Dynamic Noise Attenuation: This method is taught in a patent application entitled "Method for Signal-to-Noise Ratio Enhancement of Seismic Data Using Frequency Dependent True Relative Amplitude Noise Attenuation" to Herkenhoff et. al., U.S. Ser. No. 10/442,392. The DNA Method is an inverse noise weighting algorithm, which can often be a powerful noise attenuation technique and can be used in conjunction with other techniques in any common-geometry domain. The disclosure of this patent application is hereby incorporated by reference in its entirety. The particular importance of this specific step lies in its ability to largely preserve the relative amplitudes of the coherent signals in a gather in the presence of random noise, thus minimizing the effect of amplitude bias.

Figure 6:
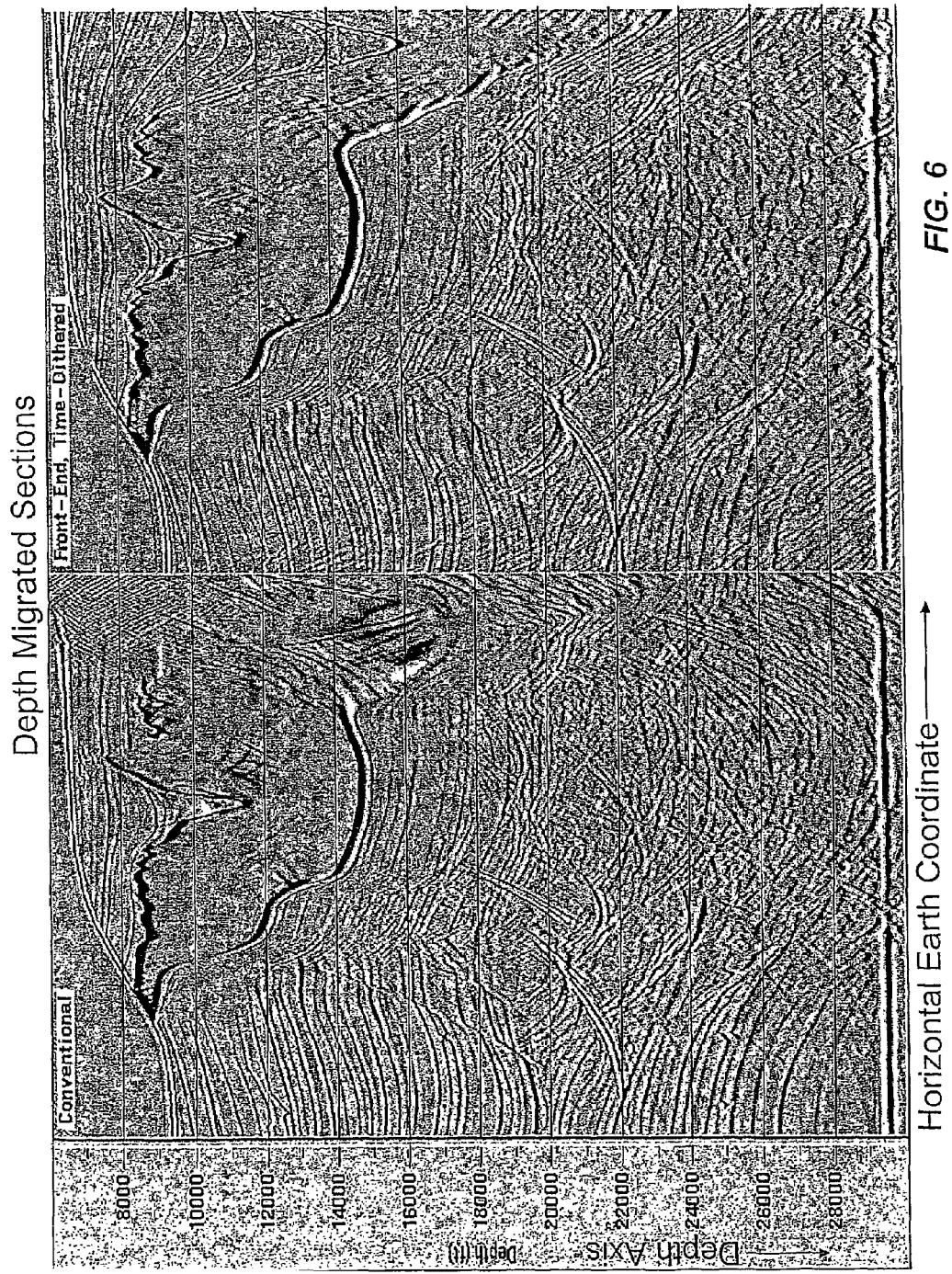
FIG. 6 compares migrated results from both conventional (one-source) acquisition and multiple quasi-simultaneously activated sources.

Because attenuation of random noise often amounts to a localized summing over signal trajectories to achieve so-called "root-n" noise reduction, different signal domains require different summing trajectories. Further, because even an approximate velocity model is useful to define signal trajectories as part of the migration summation process, random noise attenuation may be accomplished by taking advantage of the signal/noise separation powers inherent in seismic imaging. Given a velocity model, migration sums events over a very large aperture (an areal aperture in the case of three-dimensional migration), greatly attenuating random noise. In FIG. 6, the results of migrating with a known earth velocity are shown for both a conventional single-source acquisition (left panel) and the two-source quasi-simultaneous acquisition (some gathers from which are shown in FIGS. 4 and 5). Evidently for this dataset migration summing has effectively attenuated the random noise permeating the two-source input gathers from FIG. 5. More importantly, when applied in the common-offset domain, migration produces noise-attenuated common-offset volumes that preserve the prestack AVO information. It is this property that makes the common-offset embodiment particularly attractive. Note that velocity analysis (needed for the migration), which measures semblance, will work even on CMP gathers in which the random noise has not been attenuated. Alternatively, migration of quasi-simultaneous source data even with a suboptimal velocity function, followed by filtering, followed by demigration using the same velocity function can also attenuate random noise. All of the above techniques are equally preferred. Finally, one skilled in the art can appreciate that noise attenuation can also be realized by a concatenation of multiple processing steps such as those described above.

Figure 7:
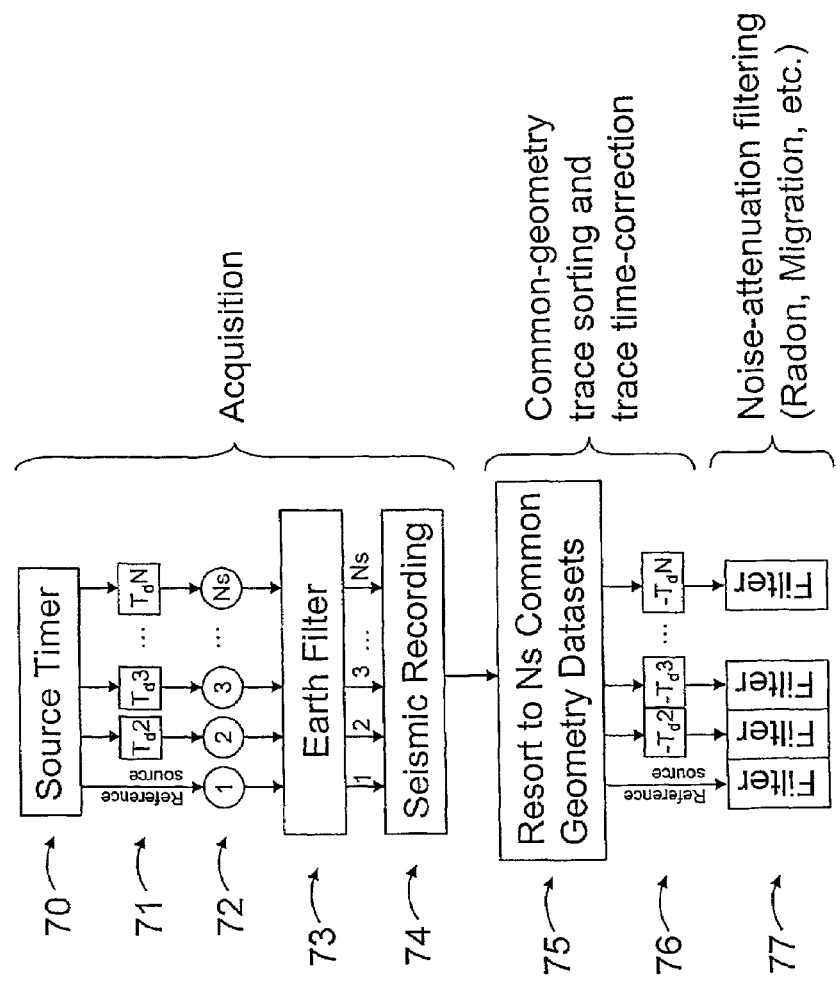
FIG. 7 is a flowchart summarizing the acquisition, trace-sorting, and noise attenuation segments of this invention.

The foregoing segments detailed by this invention are summarized in flowchart form in FIG. 7. At each successive location of the constellation within the seismic survey, a master source timer 70 communicates the appropriate time delay 71 ($T_d$) to each of the Ns−1 satellite sources 72. (The reference source, by definition above, has a total time delay of zero.) The sources are thus activated quasi-simultaneously, their energy enters and interacts with the earth layers 73, and the reflected and scattered waves are recorded by a common set of spaced apart receivers 74. The time delays $T_d$ associated with each source are also recorded in 74.

After acquisition, each trace contains seismic events (reflections, refractions, etc.) from each of the Ns sources. The seismic data are resorted into Ns common-geometry datasets 75 as explained in the reference to FIG. 2 above (such as common-midpoint or common-offset, two particularly good and preferred domains). Then the traces in each of the Ns−1 satellite source datasets have applied to them the negative time delay 76 associated with that trace and that satellite source. Lastly, Ns noise-attenuation filtering operations 77 can be applied, because in each of the Ns data volumes the energy from only one source appears coherent, while the energy from all other sources appears as incoherent noise.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for obtaining seismic data comprising the steps of:
   translating a constellation of seismic energy sources along a survey path, the seismic energy sources including a reference energy source and at least one satellite energy source;
   translating along the survey path a streamer of spaced apart receivers, wherein the receivers are disposed generally in a linear alignment along a predetermined length of the streamer;
   positioning the at least one satellite energy source in a perpendicular displacement to the direction of the streamer of receivers to provide a plurality of azimuthal coverage, wherein the at least one satellite energy source is located laterally outboard from the streamer at a distance of at least one-tenth of the length of the streamer; and
   activating the reference energy source and the at least one satellite energy source at a time delay relative to the activation of the reference energy source once each at spaced part activation locations along the survey path to generate a series of superposed wavefields which propagate through a subsurface and are reflected from and refracted through material heterogeneities in the subsurface, the time delay being varied between the spaced apart activation locations; and
   recording seismic data including seismic traces generated by the series of superposed wavefields utilizing the spaced apart receivers.

2. The method of claim 1 wherein the time delay includes a constant portion which remains constant for any particular source for the duration of the seismic survey and a variable portion, which varies for each source and for each activation location.

3. The method of claim 1 wherein the streamer includes a cable and the receivers and streamer is towed by a marine vessel.

4. The method of claim 1 wherein the variable time delays range from plus to minus one-half the time taken to translate the constellation between successive activation locations.

5. The method of claim 1 wherein there is a plurality of satellite energy sources.

6. The method of claim 5 wherein the time delay is variable between each of the plurality of energy sources in the constellation at each of the activation locations.

7. The method of claim 1 for obtaining seismic data, which further includes migrating the seismic data using the time delays to image signals generated from the respective energy sources.

* * * * *